United States Patent
Mackie et al.

(10) Patent No.: US 11,252,072 B1
(45) Date of Patent: Feb. 15, 2022

(54) GRAPH-BASED REBINDING OF PACKET PROCESSORS

(71) Applicant: Juniper Networks, Inc., Sunnyvale, CA (US)

(72) Inventors: Scott Mackie, Santa Cruz, CA (US); Swamy Sadashivaiah Renu Kananda, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 54 days.

(21) Appl. No.: 16/717,593

(22) Filed: Dec. 17, 2019

(51) Int. Cl.
H04L 12/751 (2013.01)
H04L 12/931 (2013.01)
H04L 45/02 (2022.01)
H04L 49/40 (2022.01)

(52) U.S. Cl.
CPC ............. *H04L 45/02* (2013.01); *H04L 49/40* (2013.01)

(58) Field of Classification Search
CPC ..... H04L 45/02; H04L 49/40; H04L 41/5045; H04L 41/12; H04L 41/28; H04Q 3/0029
See application file for complete search history.

(56) References Cited

U.S. PATENT DOCUMENTS

| | | | |
|---|---|---|---|
| 7,215,637 B1 | 5/2007 | Ferguson et al. | |
| 7,990,993 B1 | 8/2011 | Ghosh et al. | |
| 8,527,980 B2 * | 9/2013 | Stich | G06F 8/65 717/172 |
| 8,806,058 B1 | 8/2014 | Mackie et al. | |
| 9,491,094 B2 * | 11/2016 | Patwardhan | H04L 45/44 |
| 9,584,371 B2 * | 2/2017 | Zhang | H04L 41/12 |
| 9,853,898 B1 * | 12/2017 | Subramanian | H04L 45/745 |
| 9,871,703 B2 * | 1/2018 | Cortes Gomez | H04L 63/0435 |
| 10,469,357 B2 | 11/2019 | Kananda et al. | |
| 10,491,525 B2 * | 11/2019 | Li | H04L 47/18 |

* cited by examiner

*Primary Examiner* — Chandrahas B Patel
(74) *Attorney, Agent, or Firm* — Shumaker & Sieffert, P.A.

(57) ABSTRACT

In one example, a method comprises generating, by a forwarding manager for an internal forwarding path executed by a plurality of packet processors of a forwarding unit of a network device, a dependencies structure that specifies one or more dependencies for a plurality of nodes, wherein the plurality of nodes represent different types of forwarding path elements of the forwarding path, wherein the plurality of nodes is binded to a first set of one or more packet processors of the plurality of packet processors; and rebinding, by the forwarding manager, a second set of one or more packet processors of the plurality of packet processors to the plurality of nodes, wherein rebinding the second set of one or more packet processors to the plurality of nodes is performed in a reverse direction of the dependencies structure.

18 Claims, 11 Drawing Sheets

GRAPH-BASED REBINDING OF PACKET PROCESSORS

The disclosure relates to packet-based computer networks and, more particularly, to processing packets within network devices.

BACKGROUND

A computer network is a collection of interconnected computing devices that can exchange data and share resources. Example network devices include layer two devices that operate within the second layer of the Open Systems Interconnection (OSI) reference model, i.e., the data link layer, and layer three devices that operate within the third layer of the OSI reference model, i.e., the network layer. Network devices within computer networks often include a control unit that provides control plane functionality for the network device and one or more forwarding units for routing or switching data units, e.g., packets. In some cases, for example, a network device may include a plurality of packet processors and a switch fabric that collectively provide a forwarding plane for forwarding network traffic.

The control plane functionality provided by the network device include storing network topologies in the form of a routing information base (RIB), executing routing protocols to communicate with peer routing devices to maintain and update the RIB, and providing a management interface to allow user access and configuration of the network device. The control unit maintains routing information that represents the overall topology of the network and defines routes to destination prefixes within the network.

The control unit derives a forwarding information base (FIB) that defines forwarding path elements for packet lookup and other processing operations to be performed by the forwarding units, the FIB being generated by the control unit in accordance with the routing information and control information. The control unit installs the FIB within the forwarding plane to programmatically configure the forwarding units. The representation of the FIB stored to forwarding units may be referred to as the hardware FIB.

The data and instructions that constitute the forwarding path elements may be connected and arranged into a forwarding topology that defines an internal forwarding path for each incoming packet received by the network device. For example, to generate a route table lookup forwarding path element, the control unit selects routes defined by the network topology and maps packet key information (e.g., destination information and other select information from a packet header) to one or more specific next hop network devices and ultimately to one or more specific output interfaces of interface cards of the network device. In some cases, the control unit may install the forwarding path element into each of the forwarding units to update the FIB within each of the forwarding units and control traffic forwarding within the forwarding plane. For a given packet, a forwarding unit executes the forwarding path elements as defined by the internal forwarding path of the forwarding unit for the packet to perform the actions defined and configured by the control unit within the forwarding unit. Bifurcating control and forwarding plane functionality allows the FIB in each of forwarding units to be updated without degrading packet forwarding performance of the network device.

SUMMARY

In general, the disclosure describes techniques for graph-based rebinding of packet processors. For example, packet processors of a network device process packets by performing a series of operations on each packet over respective internal packet forwarding paths as packets traverse the internal forwarding architecture of the network device (which may be referred to as a "forwarding plane"). Packet processors execute forwarding path elements to process received packets, such as simple actions (e.g., counters, policers, discards) and conditionals to complex constructs such as tables, trees, and lookups. In some examples, a forwarding manager of the forwarding plane provides graph management for a forwarding path for one or more line cards. For example, a forwarding manager models a forwarding path as a collection of connected element nodes (hereinafter, "nodes") that may represent different types of forwarding path elements. Nodes can have one or more dependencies that specify the relationships to other nodes and are specified in a dependency structure, e.g., node graph. The node graph is a data structure used as a template to program the underlying packet processors with forwarding path elements represented by the nodes. The operation of creating the forwarding path elements from the nodes is called "binding." As further described in this disclosure, a computing device may leverage a node graph to add one or more packet processors to already "live" nodes (e.g., nodes that are already used to create the forwarding state to an existing set of one or more packet processors), referred to herein as "rebinding."

As one example, a network device includes a forwarding manager that leverages a node graph to atomically update a set of one or more packet processors to one or more nodes for the forwarding path. To perform rebinding, the forwarding manager updates, for each node of the node graph in a reverse direction, a bitmask that identifies a set of one or more packet processors. For example, the forwarding manager may determine, from the node graph, the one or more nodes that do not have a child node in the forwarding topology (referred to herein as a "termination node" or a "leaf" node). Starting with a termination node, the forwarding manager updates a first bitmask of the termination node that indicates the termination node is binded with a previous set of one or more packet processors, to a second bitmask that indicates that the node is rebinded to the updated set of one or more packet processors.

The forwarding manager may then walk backwards through the node graph to rebind nodes that precede the termination node (where such preceding nodes may be referred to as a "parent node"). For example, the forwarding manager may identify a preceding node to the termination node (by, for example, following a pointer from the termination node to the preceding node) and determine whether dependencies of the preceding node are rebinded. If the dependencies are rebinded, the preceding node is rebinded. If any of the dependencies are not rebinded, the preceding node is not rebinded. That is, the forwarding manager rebinds nodes only when all of the dependencies of the node are rebinded. The forwarding manager performs the rebinding operation by stepping through the node graph starting from each termination node until all nodes are rebinded.

The techniques may provide one or more technical advantages that realizes a practical application. For example, by rebinding nodes of the node graph in a reverse direction, the underlying dependencies of the live nodes are maintained, thereby potentially allowing preceding nodes to be successfully binded and so on until the entire node graph is binded to the newly added (or in other words, online) packet processor. Moreover, the techniques of this disclosure enable a more flexible state sharing method such that individual packet processors that may be in error can be corrected and rebinded potentially without resetting all packet processors to reprogram the packet processors, which may cause a disruption in traffic flow.

In one example, a method includes generating, by a forwarding manager for an internal forwarding path executed by a plurality of packet processors of a forwarding unit of a network device, a dependencies structure that specifies one or more dependencies for a plurality of nodes, wherein the plurality of nodes represent different types of forwarding path elements of the forwarding path, wherein the plurality of nodes is binded to a first set of one or more packet processors of the plurality of packet processors. The method also includes rebinding, by the forwarding manager, a second set of one or more packet processors of the plurality of packet processors to the plurality of nodes, wherein the second set of one or more processors includes the first set of one or more packet processors, wherein rebinding the second set of one or more packet processors of the plurality of packet processors to the plurality of nodes is performed in a reverse direction of the dependencies structure.

In another example, a network device includes a control unit configured to execute at least one application; a forwarding unit comprising: an interface card configured to receive packets; at least one packet processor operably coupled to a memory; an internal forwarding path, wherein at least a portion of the forwarding path is stored in the memory and is executable by the at least one packet processor; a forwarding unit processor; and a forwarding manager configured for execution by the forwarding unit processor, wherein the forwarding manager is configured to: generate a dependencies structure that specifies one or more dependencies for a plurality of nodes, wherein the plurality of nodes represent different types of forwarding path elements of the forwarding path, wherein the plurality of nodes is binded to a first set of one or more packet processors of the plurality of packet processors, and rebind a second set of one or more packet processors of the plurality of packet processors to the plurality of nodes, wherein to rebind the second set of one or more packet processors to the plurality of nodes is performed in a reverse direction of the dependencies structure.

In another example, a non-transitory computer-readable medium comprising instructions for causing one or more programmable processors and at least one packet processor of a forwarding unit of a network device to: generate a dependencies structure that specifies one or more dependencies for a plurality of nodes, wherein the plurality of nodes represent different types of forwarding path elements of the forwarding path, wherein the plurality of nodes is binded to a first set of one or more packet processors of the plurality of packet processors, and rebind a second set of one or more packet processors of the plurality of packet processors to the plurality of nodes, wherein to rebind the second set of one or more packet processors to the plurality of nodes is performed in a reverse direction of the dependencies structure.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

Like reference characters denote like elements throughout the figures and text.

DETAILED DESCRIPTION

Figure 1:
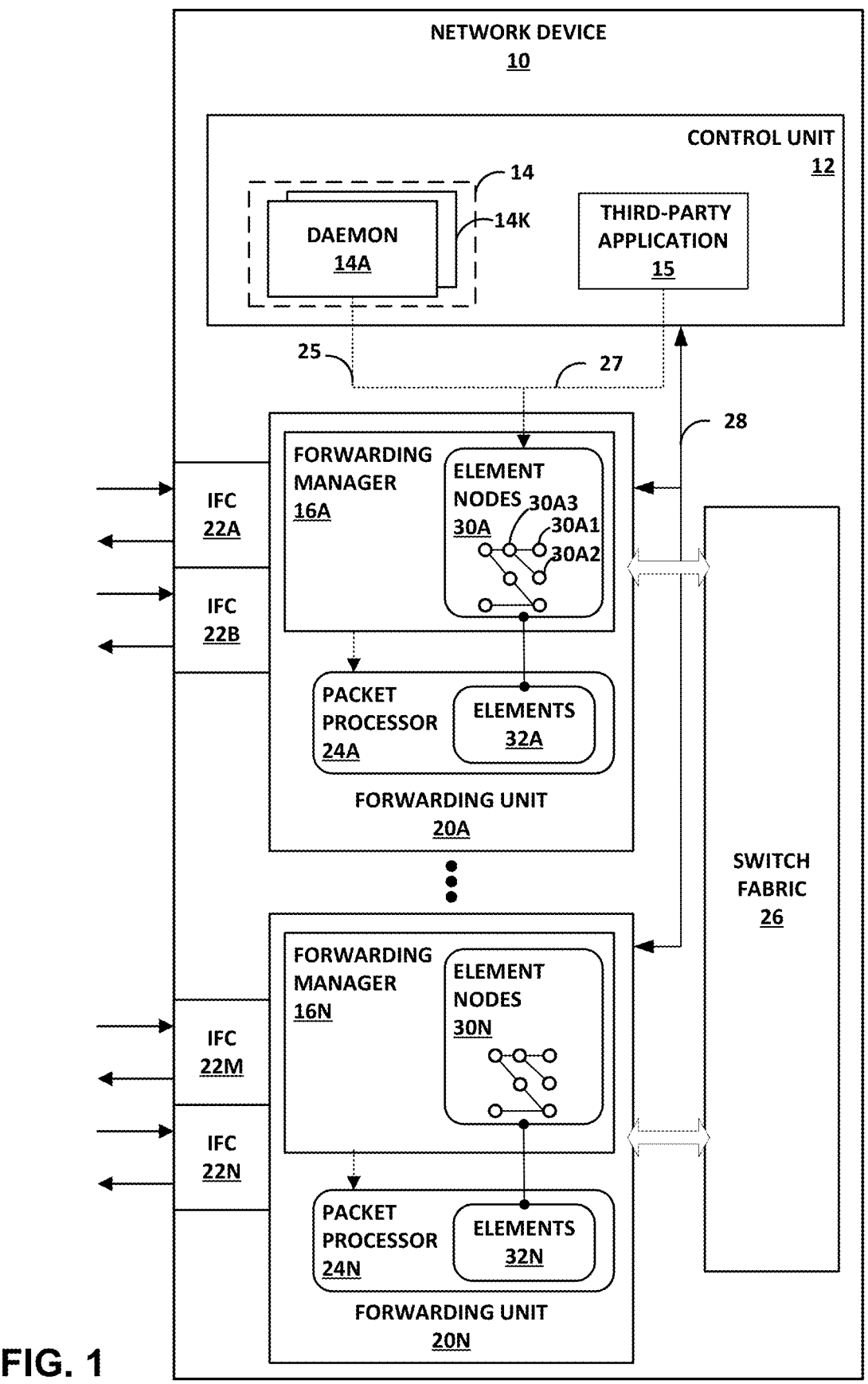
FIG. 1 is a block diagram illustrating an example network device in which one or more forwarding units are configured, according to techniques described in this disclosure.

FIG. 1 is a block diagram illustrating an example network device configured to provide graph-based rebinding of packet processors, according to techniques described herein. Network device 10 may include a router such as a provider edge or customer edge router, a core router, or another type of network device, such as a switch. In this example, network device 10 includes a control unit 12 that provides control plane functionality for the device.

Network device 10 also includes a plurality of forwarding units 20A-20N ("forwarding units 20") and a switch fabric 26 that together provide a data plane for processing network traffic. Forwarding units 20 receive and send data packets via interfaces of interface cards 22A-22N ("IFCs 22") each associated with a respective one of forwarding units 20. Each of forwarding units 20 and its associated ones of IFCs 22 may represent a separate line card insertable within a chassis (not shown) of network device 10. Example line cards include flexible programmable integrated circuit (PIC) concentrators (FPCs), dense port concentrators (DPCs), and modular port concentrators (MPCs).

Each of IFCs 22 may include interfaces for various combinations of layer two (L2) technologies, including Ethernet, Gigabit Ethernet (GigE), and Synchronous Optical Networking (SONET) interfaces, that provide an L2 interface for transporting network packets. In various aspects, each of forwarding units 20 may include more or fewer IFCs. Switch fabric 26 provides a high-speed interconnect among forwarding units 20 for forwarding incoming data packets to an egress forwarding unit of forwarding units 20 for output over a network that includes network device 10.

Control unit 12 is connected to each of forwarding units 20 by internal communication links 28. Internal communication links 28 may include a 100 Mbps Ethernet connection, for instance. Control unit 12 configures, by sending instructions and other configuration data via internal communication link 28, forwarding units 20 to define packet processing operations applied to packets received by forwarding units 20.

Control unit 12 executes a plurality of applications, including daemons 14A-14K ("daemons 14") and one or more third-party applications 15. Each of the applications may represent a separate process managed by a control unit operating system. Daemons 14 may represent user-level processes that are developed and deployed by the manufacturer of the network device 10. As such, daemons 14 are "native" to the network device 10 in that the development of the applications is carefully managed by the manufacturer to facilitate secure, robust, and predictable operation of the network device 10, such operation defined at least in part according to a configuration specified by an operator (e.g., a service provider, enterprise, or other customer of the network device 10 manufacturer). Daemons 14 may run network management software, execute routing protocols to communicate with peer routing devices, maintain and update one or more routing tables, and create one or more forwarding tables for installation to forwarding units 20, among other functions.

Third-party applications 15 represent one or more third-party applications or in some cases applications developed by the manufacturer of the network device 10. The "third-party" typically is an operator of the network device 10 and is not the manufacturer of the network device 10. In some cases, each of third-party applications 15 presents an external application programming interface (API) by which external controllers, such as software-defined networking controllers and network management systems, may send data representing packet processing operations to be performed by forwarding units 20. In such cases, each of third-party applications 15 operates as an interface to the network device 10 data plane for the external controllers.

Control unit 12 may include one or more processors (not shown in FIG. 1) that execute software instructions, such as those used to define a software or computer program, stored to a computer-readable storage medium (again, not shown in FIG. 1), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 12 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Each forwarding unit of forwarding units 20 includes at least one packet processor 24 that processes packets by performing a series of operations on each packet over respective internal packet forwarding paths as the packets traverse the internal architecture of network device 10. Packet processor 24A of forwarding unit 20A, for instance, includes one or more configurable hardware chips (e.g., a chipset) that, when configured by applications executing on control unit 12, define the operations to be performed on packets received by forwarding unit 20. Each chipset may in some examples represent a "packet forwarding engine" (PFE). Each chipset may include different chips each having a specialized function, such as queuing, buffering, interfacing, and lookup/packet processing. Each of the chips may represent application specific integrated circuit (ASIC)-based, field programmable gate array (FPGA)-based, or other programmable hardware logic. A single forwarding unit 20 may include one or more packet processors 24.

Operations may be performed, for example, on each packet by any of a corresponding ingress interface, an ingress forwarding unit 20, an egress forwarding unit 20, an egress interface or other components of network device 10 to which the packet is directed prior to egress, such as one or more service cards. Packet processors 24 process packets to identify packet properties and perform actions bound to the properties. Each of packet processors 24 includes forwarding path elements that, when executed, cause the packet processor to examine the contents of each packet (or another packet property, e.g., incoming interface) and on that basis make forwarding decisions, apply filters, and/or perform accounting, management, traffic analysis, and load balancing, for example. In one example, each of packet processors 24 arranges forwarding path elements as next hop data that can be chained together as a series of "hops" in a forwarding topology along an internal packet forwarding path for the network device. The result of packet processing determines the manner in which a packet is forwarded or otherwise processed by packet processors 24 of forwarding units 20 from its input interface on one of IFCs 22 to, at least in some cases, its output interface on one of IFCs 22.

In many instances, the forwarding path elements perform lookup operations, such as a tree (or trie) search, a table (or index) search, a filter determination and application, or a rate limiter determination and application. Lookup operations locate, within a lookup data structure (e.g., a lookup tree), an item that matches packet contents or another property of the packet or packet flow, such as the inbound interface of the packet.

Applications configured for execution by control unit 12 determine the packet processing operations to be applied to packets by packet processors 24. In the example network device of FIG. 1, applications include daemons 14 and third-party applications 15. Third-party applications configure the packet processors 24 to perform the packet processing operations by sending, to forwarding units 20, data representing the packet processing operations. Such data may include forwarding path elements representing high-level packet processing requirements (e.g., route lookup and filtering). Packet processing operations may include fundamental packet forwarding operations such as input packet processing, route lookup, and output packet processing, as well as service functions such as packet filtering or access control, statistical sampling, traffic policing, rate limiting, and accounting.

Forwarding units 20 include respective forwarding managers 16 that translate the data representing the packet processing operations received from applications into forwarding path elements 32 (which may include forwarding "next hops" and hereinafter referred to as forwarding path elements) that include instructions executable by respective packet processors 24 and stores the forwarding path elements 32 to memory of packet processors 24 (not shown in the example of FIG. 1). Each of forwarding managers 16 may represent executable instructions, such as instructions for a process.

Packet processors 24 execute the forwarding path elements 32 to process received packets to satisfy the high-level packet processing requirements provided by the application. In this way, the applications inject higher-level representations of routes and next-hops (operations) into the stream of configurable forwarding state that is stored by packet processors and that defines, at least in part, the packet processing operations for execution by packet processors 24. Because forwarding path elements 32 may resolve to other forwarding path elements 32, forwarding path elements 32 may be chained together to define a set of packet processing operations for a given packet and form a "forwarding path" for that packet. The set of forwarding path elements 32 and forwarding state for execution and use by packet processors 24 may therefore alternatively be referred to as the forwarding path or internal forwarding path for a given packet processor 24, forwarding unit 20, or the network device 10 as a whole. Additional examples of forwarding managers and packet processors are described in U.S. Pat. No. 10,469, 357, titled "NODE REPRESENTATIONS OF PACKET FORWARDING PATH ELEMENTS," filed Jan. 12, 2018, the entire contents of which is incorporated by reference herein.

Forwarding managers 16 provide forwarding path management for one or more line cards. For example, forwarding managers 16 may model forwarding paths as a collection of connected element nodes 30 (otherwise referred to hereinafter as "nodes 30"). Nodes 30 may represent different types of forwarding path elements 32, such as simple actions (such as a counter, policer, or discard), a conditional, or a complex construct such as a table, tree, or lookup. Hereinafter, the techniques are described herein with respect to forwarding unit 20A. Although various aspects of the techniques are described with respect to forwarding unit 20A, the techniques may also be performed by any one of forwarding units 20.

Each node of nodes 30A is a data structure managed by forwarding manager 16A and represents a single forwarding path element 32A for execution by packet processor 24A. Forwarding manager 16A uses node instances to represent and refer to each of the forwarding path elements 32. Each node instance may have a type that corresponds to the type of forwarding path element (e.g., action, tree, etc.). The creation of forwarding path elements 32 from nodes 30 is referred to as "binding." Binding instantiates the forwarding state on active packet processors 24.

In some examples, forwarding manager 16A creates dependencies between nodes by using pointer-based schemes in which each forwarding path element is represented and referred to by its location in packet processor 24A memory. In some examples, forwarding manager 16A creates dependencies between nodes by referencing a token for the next node in a forwarding topology. For example, each of nodes 30A includes a token that is a unique identifier for a corresponding forwarding path element 32A that uniquely identifies the node within a context for the corresponding forwarding path element 32. The unique identifier may be an integer value, e.g., a 64-bit or other n-bit integer value, for the token. Forwarding manager 16A may specify a second, next forwarding path element for a first forwarding path element by adding the token of the second, next forwarding path element to a list of next forwarding path elements for the first forwarding path element. This inherent token referencing allows connections between nodes to be easily abstract and thus more readily manipulated, provides a consistent interface across process and memory boundaries within forwarding manager 16A, and may facilitate multi-threading.

Each node of nodes 30A can have dependencies, which are other nodes that are referred to by a pointer or unique tokens of the other nodes. Such dependencies may include not only the next forwarding path elements for the node but also include dependencies that notify forwarding manager 16A that a change in one node or entry may require another node to be updated. Forwarding manager 16A may generate a dependency structure, e.g., one or more node graphs, that specifies the dependencies of nodes 30A. Forwarding manager 16A may use the node graph as a template to program the forwarding state (or updates to the forwarding state) of the underlying packet processors 24.

In some examples, one or more packet processors 24 may be offline. For example, packet processors may have allocated line card slots that are unused and may go offline (which may refer to a standby, low-power, inactive, or other disabled or semi-disabled state) to conserve power. When these packet processors go online (which may refer to an active, powered, or other fully or semi-fully enabled state), these packet processors may not have the forwarding state configured. For example, the forwarding state is not instantiated on these packet processors because the forwarding manager has not yet created the forwarding path elements from the nodes of the node graph. In some examples, all forwarding units 20 are reset to reprogram the packet processors 24 at the same time. However, in these examples, one or more packet processors may already have been binded to one or more nodes prior to the reset. By resetting all forwarding units 20 to reprogram the packet processors 24, the packet processors are switched offline for a period of time, which interrupts traffic flow for the packet processors that are already binded to the nodes.

In accordance with the techniques described in this disclosure, forwarding manager 16A may perform graph-based rebinding of packet processors. As described in further detail below, forwarding manager 16A may add packet processors to already live nodes (e.g., nodes that are already used to create the forwarding state to an existing set of one or more packet processors) of the node graph in a reverse direction.

In the example of FIG. 1, one or more of element nodes 30A are initially binded to a first set of one or more packet processors of packet processors 24. For example, forwarding manager 16A may generate an initial node graph including element nodes 30A and uses the node graph as a template to program the first set of one or more packet processors with forwarding path elements represented by the nodes. In response to additional packet processors of packet processors 24 going online, forwarding manager 16A may rebind the nodes to the updated set of packet processors. To rebind the nodes, forwarding manager 16A may determine one or more termination nodes from the node graph, e.g., node 30A1. A termination node may represent a node that does not reference (e.g., does not have a pointer to) a child node in the forwarding topology of the node graph. Forwarding manager 16A may initially rebind node 30A1 with an updated set of one or more packet processors 24 and then rebind nodes that precede node 30A1. As one example, forwarding manager 16A may update a bit mask of node 30A1 (referred to herein as "binding mask") that identifies a set of one or more active packet processors bound to the node. For example, nodes 30A may initially have a binding mask that identifies an initial set of one or more packet processors binded to nodes 30A. As one example, nodes 30A may initially be binded to a first set of one or more packet processors identified by a first binding mask (e.g., 00001111). Forwarding manager 16A may update the binding mask of node 30A1 with a new binding mask that identifies an updated set of one or more packet processors. For instance, if additional packet processors are to be added to nodes 30A, the binding mask of node 30A1 is updated (e.g., 11111111) to indicate node 30A1 is rebinded to the updated set of one or more packet processors. The example described herein is simplified to a binding mask of 8 bits, but may include any size bit mask that identifies any number of packet processors.

After rebinding node 30A1, forwarding manager 16A may walk backwards along the node graph (e.g., in the left direction in this example) to rebind nodes preceding node 30A1. Forwarding manager 16A may rebind a node only when all dependencies of the node are rebinded. For example, node 30A3, which precedes node 30A1, has dependencies, e.g., node 30A1 and node 30A2. Forwarding manager 16A may rebind node 30A3 only if nodes 30A1 and 30A2 are rebinded. In this example, because node 30A2 has not yet been rebinded, forwarding manager 16A may skip the rebinding of node 30A3. For example, forwarding manager 16A may determine that it has pointers to nodes 30A1 and 30A2, and based on the binding mask of the nodes can determine whether nodes 30A1 and 30A2 have been rebinded. Forwarding manager 16A may then proceed to rebind the next termination node of the node graph, e.g., node 30A2. In response to rebinding node 30A2 with the updated set of one or more packet processors 24, forwarding manager 16A can then rebind the node 30A3 with the updated set of one or more packet processors because the dependencies of node 30A3 are rebinded. This process continues until all the nodes of the node graph are rebinded.

In this way, by rebinding nodes of the node graph in a reverse direction, the underlying dependencies of the live nodes are maintained, thereby potentially allowing preceding nodes to be successfully binded and so on until the entire node graph is binded to the newly added (or in other words, online) packet processor. Moreover, the techniques of this disclosure enable a more flexible state sharing method such that individual packet processors that may be in error can be corrected and rebinded potentially without resetting all packet processors to reprogram the packet processors, which may cause a disruption in traffic flow.

FIGS. 2A-2H are example stages of a graph-based rebinding operation, according to the techniques of this disclosure. In the example of FIGS. 2A-2H, node graph 200 includes nodes 202A-202G (collectively, "nodes 202"). Nodes 202 may represent example instances of nodes 30 of FIG. 1.

Figure 2A:
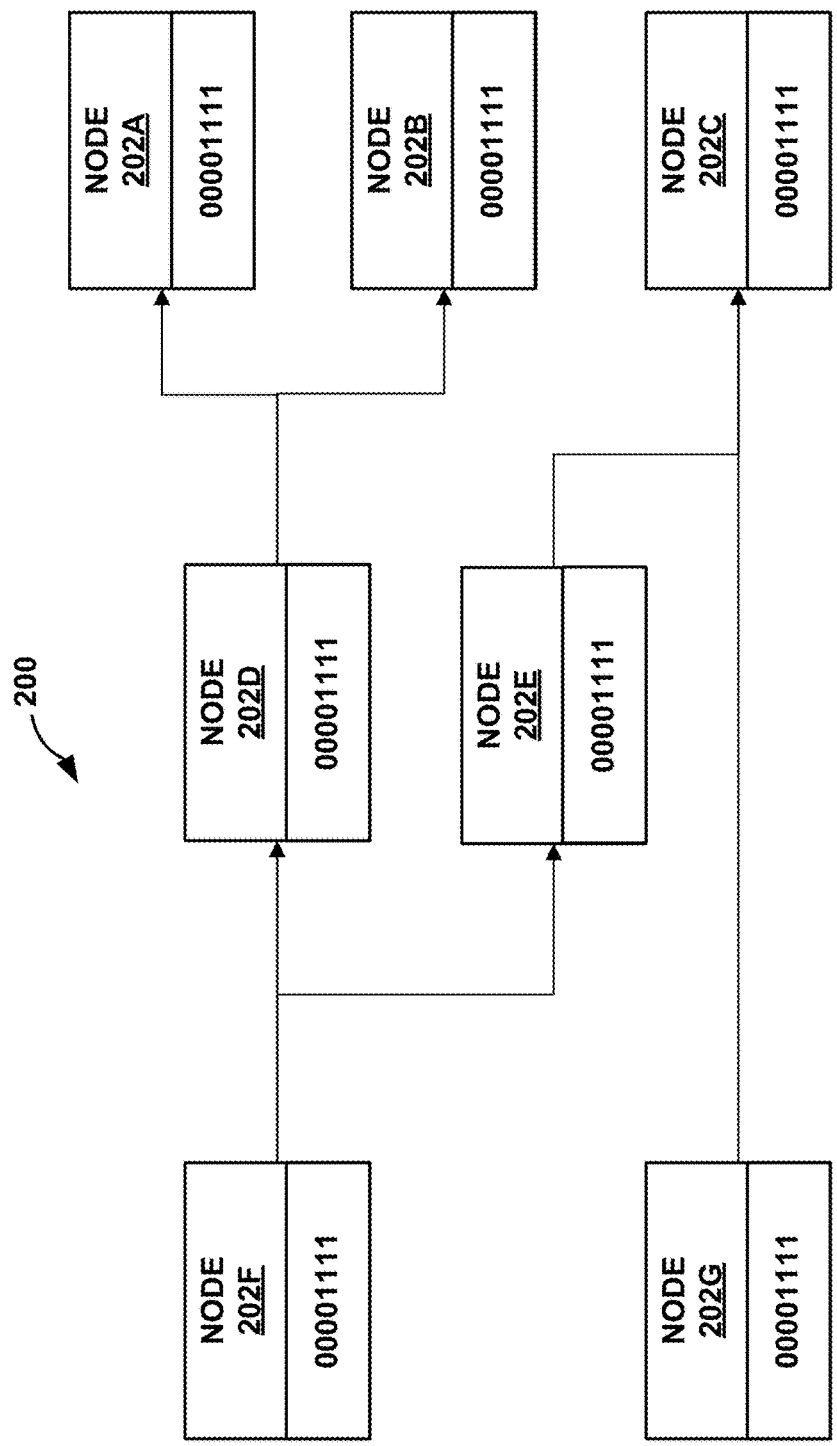
FIGS. 2A-2H are block diagrams illustrating an example rebinding operation using a node graph, according to techniques described in this disclosure.

In the example of FIG. 2A, nodes 202 of node graph 200 are live nodes that are binded to an initial set of packet processors (e.g., packet processors 0-3) as indicated by binding mask 00001111 (as indicated by the four least significant bits). Forwarding manager 16A may add packet processors (e.g., packet processors 4-7) to the live nodes that are already binded to the initial set of packet processors. For example, forwarding manager 16A may update binding mask of nodes 202 with a value of 11111111 that identifies the updated set of packet processors (e.g., packet processors 0-7). As further described below, forwarding manager 16A may update the binding mask of nodes 202 of node graph 200 in a reverse order.

Figure 2B:
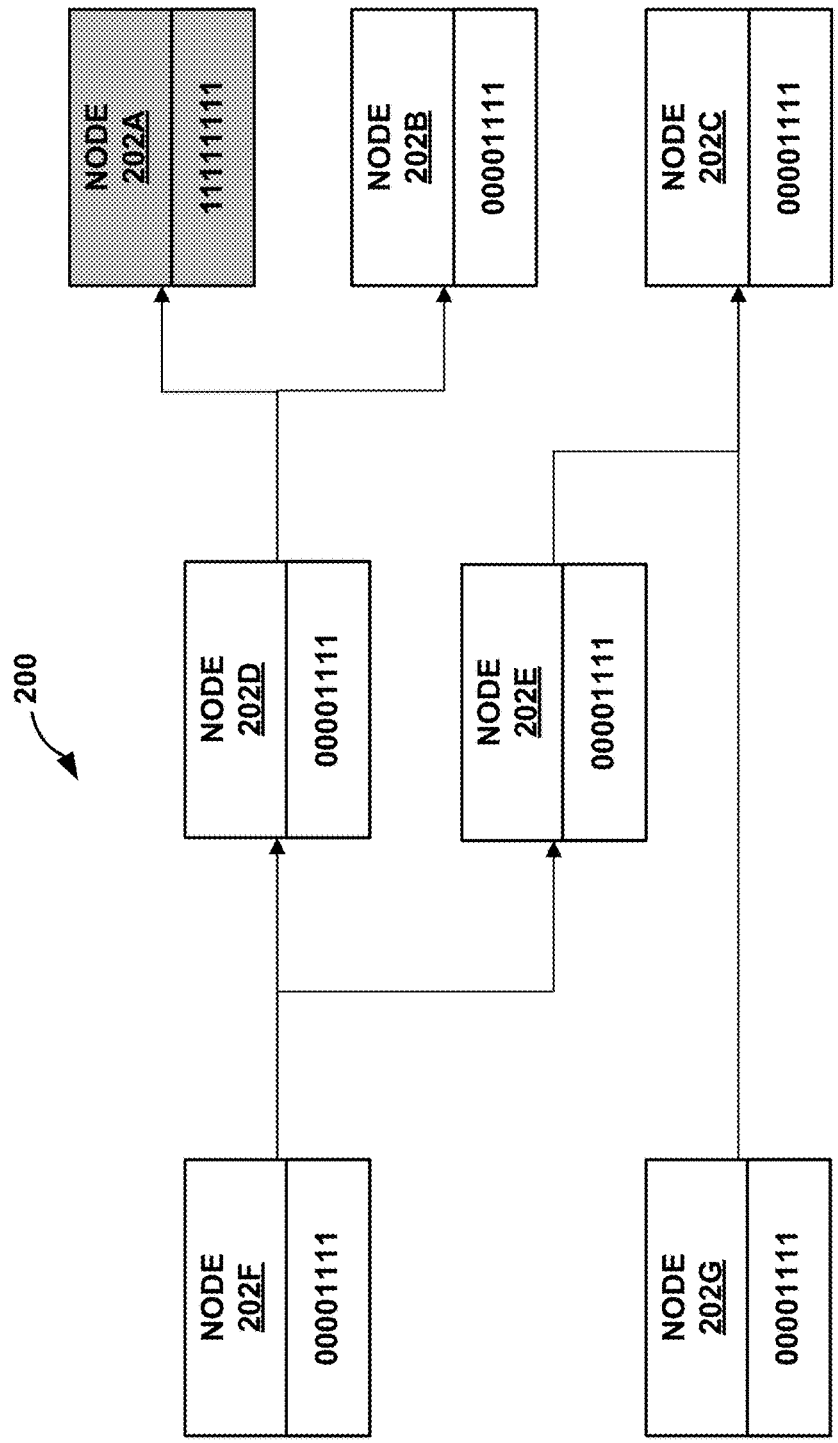

In the example of FIG. 2B, forwarding manager 16A may perform a rebinding operation by initially determining one or more termination nodes of node graph 200. In this example, forwarding manager 16A may determine that nodes 202A, 202B, and 202C do not have a child node in the forwarding topology of the node graph, and are therefore termination nodes. In the example described in FIG. 2B, forwarding manager 16A may initiate the rebinding operation with node 202A, but may initiate the rebinding operation with any termination node, e.g., node 202B or 202C.

In this example, forwarding manager 16A updates the binding mask of node 202A with the value of 11111111 to rebind node 202A with the updated set of packet processors. In response to rebinding node 202A, forwarding manager 16A may walk backwards along node graph 200 from node 202A to identify a preceding node, e.g., node 202D, to be rebinded. In this example, forwarding manager 16A determines (e.g., from pointers) that node 202D has dependencies, e.g., nodes 202A and 202B. At this stage in the rebinding operation, node 202B is not rebinded. Forwarding manager 16A determines whether the binding masks of nodes 202A and 202B are updated. Because node 202B is not rebinded (e.g., as indicated by the binding mask of 00001111), forwarding manager 16A skips the rebinding of node 202D. Forwarding manager 16A does not advance past node 202D because element node 202D is not rebinded.

Figure 2C:
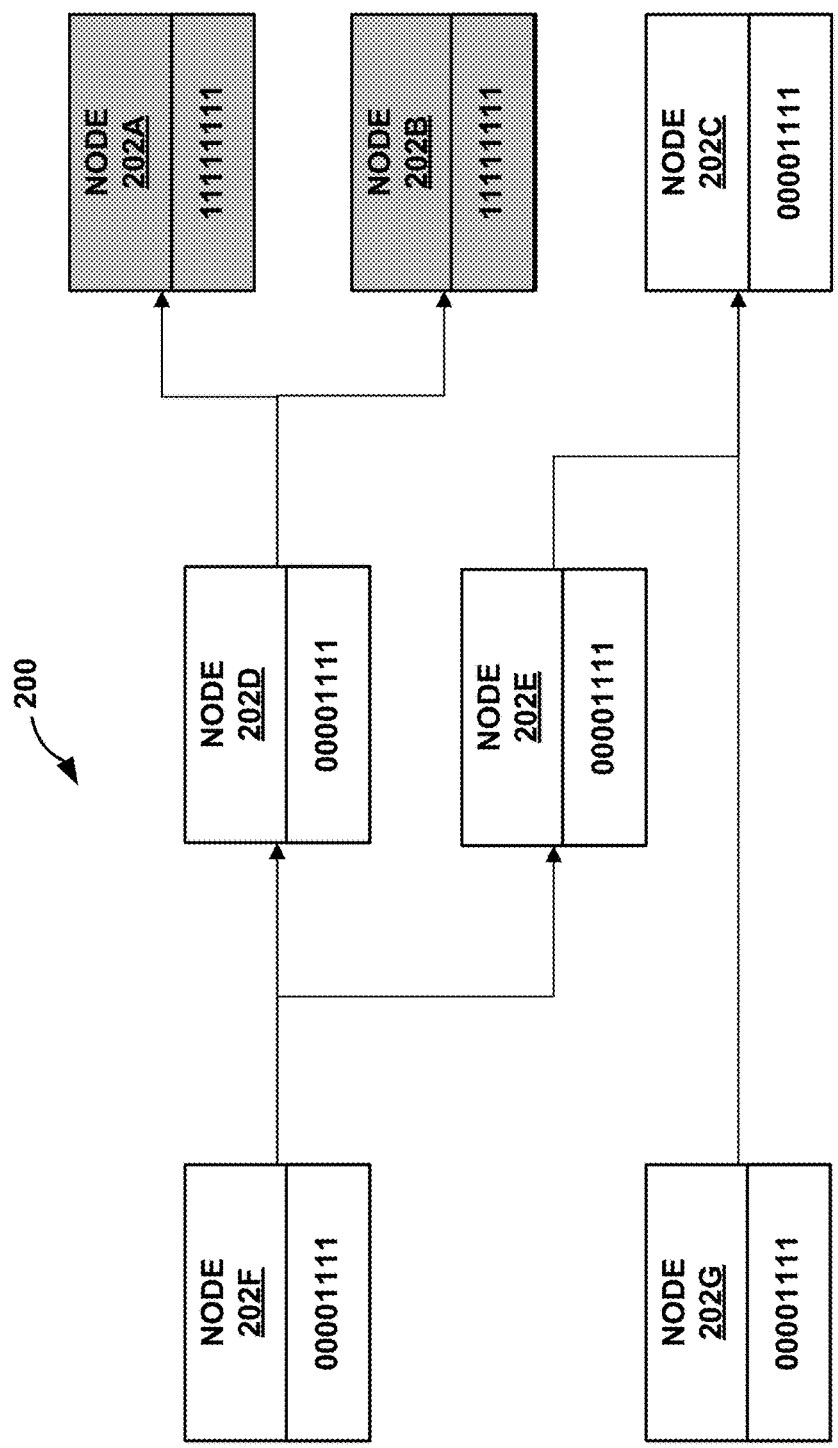

In the example of FIG. 2C, forwarding manager 16A may perform rebinding on the next termination node, e.g., node 202B. Forwarding manager 16A may update the binding mask of node 202B with the value of 11111111 to rebind node 202B with the updated set of packet processors.

Figure 2D:
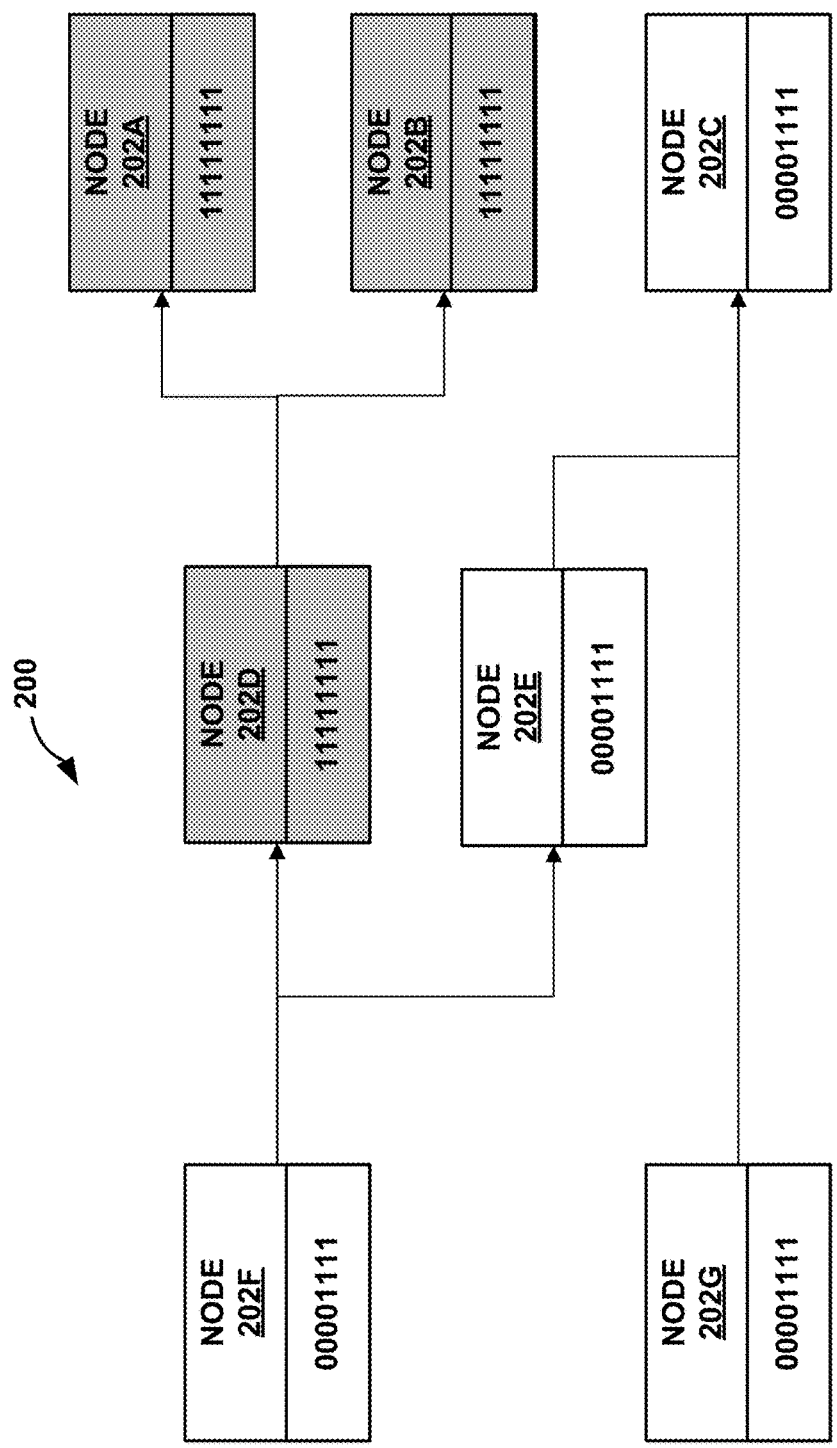

In the example of FIG. 2D, forwarding manager 16A may walk backwards along node graph 200 from node 202B to identify a preceding node, e.g., node 202D, to be rebinded. In this example, forwarding manager 16A determines that the dependencies of node 202D are rebinded. Because dependency nodes 202A and 202B are rebinded (e.g., as indicated by the binding mask of 11111111 of each dependency node), forwarding manager 16A updates the binding mask of node 202D with the value of 11111111 to rebind node 202D with the updated set of packet processors.

Forwarding manager 16A may walk backwards along node graph 200 from node 202D to identify a preceding node, e.g., node 202F, to be rebinded. In this example, forwarding manager 16A determines that node 202F has dependencies, e.g., nodes 202D and 202E. At this stage in the rebinding operation, node 202E is not rebinded. Because node 202E is not rebinded, forwarding manager 16A skips the rebinding of node 202F.

Figure 2E:
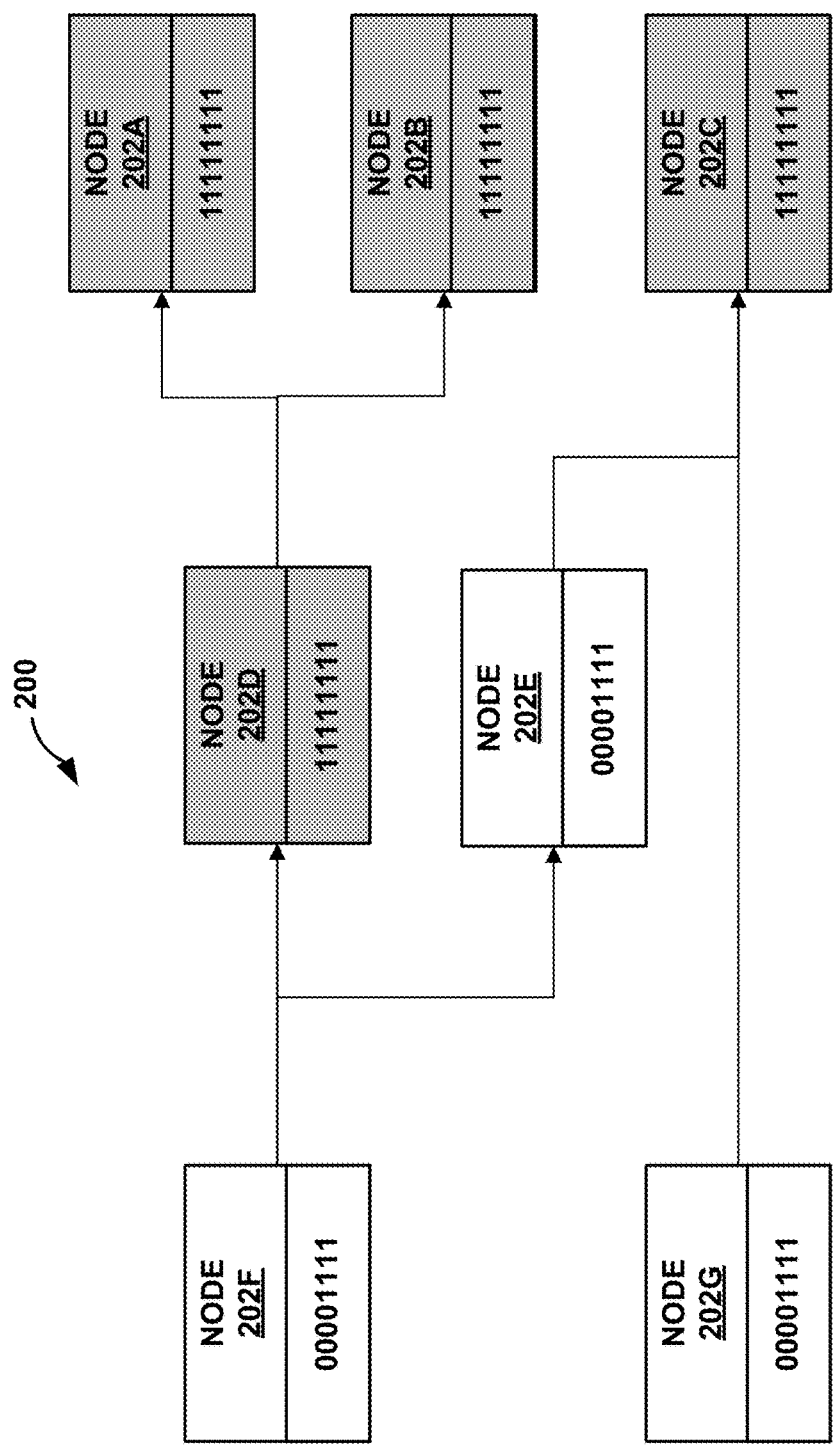

In the example of FIG. 2E, forwarding manager 16A may perform rebinding on the next termination node, e.g., element node 202C. Forwarding manager 16A may update the binding mask of node 202C with the value of 11111111 to rebind node 202C with the updated set of packet processors.

Figure 2F:
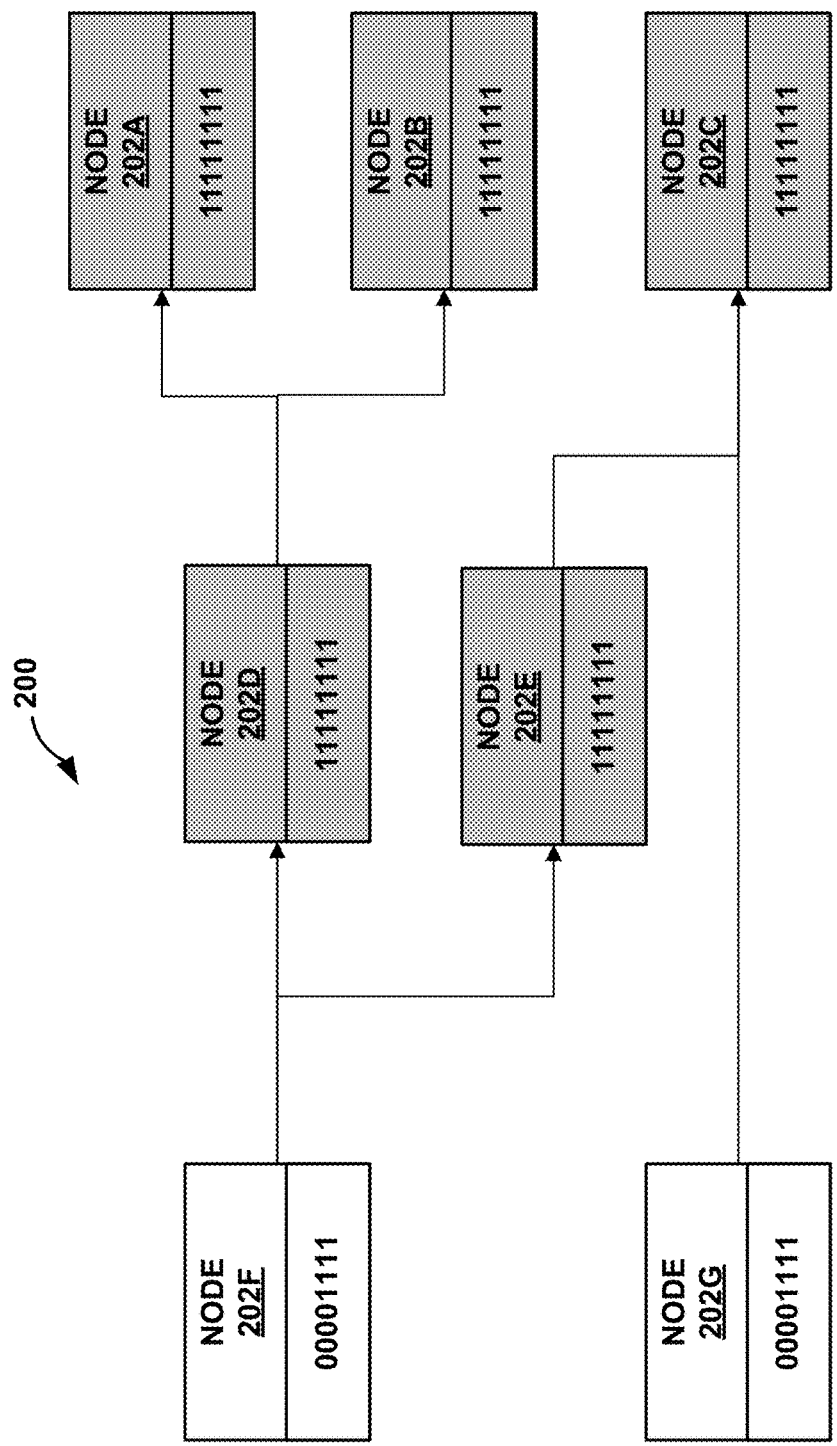

In the example of FIG. 2F, forwarding manager 16A may walk backwards along node graph 200 from node 202C to identify a preceding node, e.g., node 202E, to be rebinded. In this example, forwarding manager 16A determines that the dependencies of node 202E are rebinded. Because dependency node 202C is rebinded, forwarding manager 16A updates the binding mask of node 202E with the value of 11111111 to rebind node 202D with the updated set of packet processors.

Figure 2G:
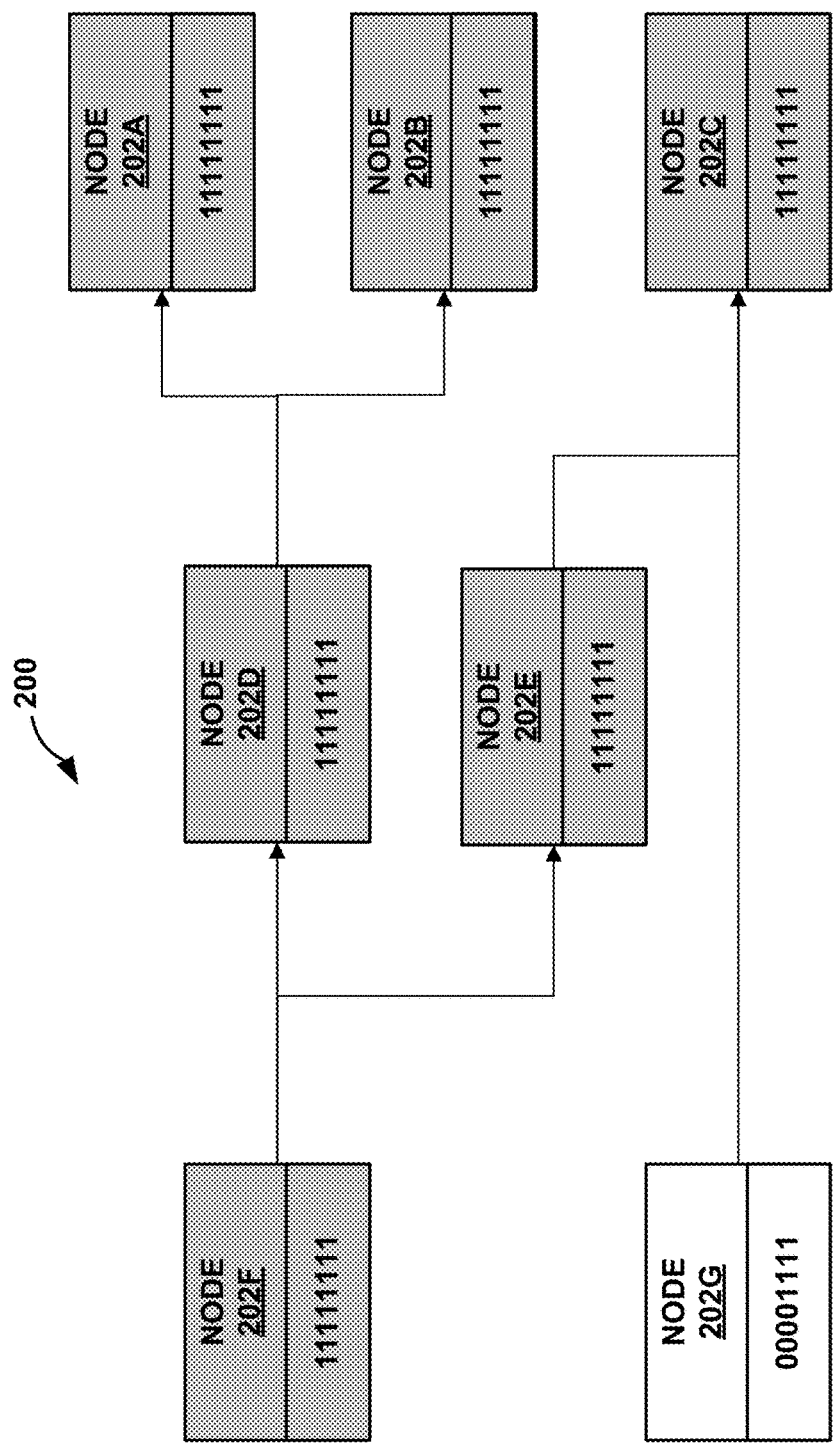

In the example of FIG. 2G forwarding manager 16A may walk backwards along node graph 200 from node 202E to identify a preceding node, e.g., node 202F, to be rebinded. In this example, forwarding manager 16A determines that dependency nodes 202D and 202E are rebinded. Because dependency nodes 202D and 202E are rebinded, forwarding manager 16A updates the binding mask of node 202F with the value of 11111111 to rebind node 202F with the updated set of packet processors.

Figure 2H:
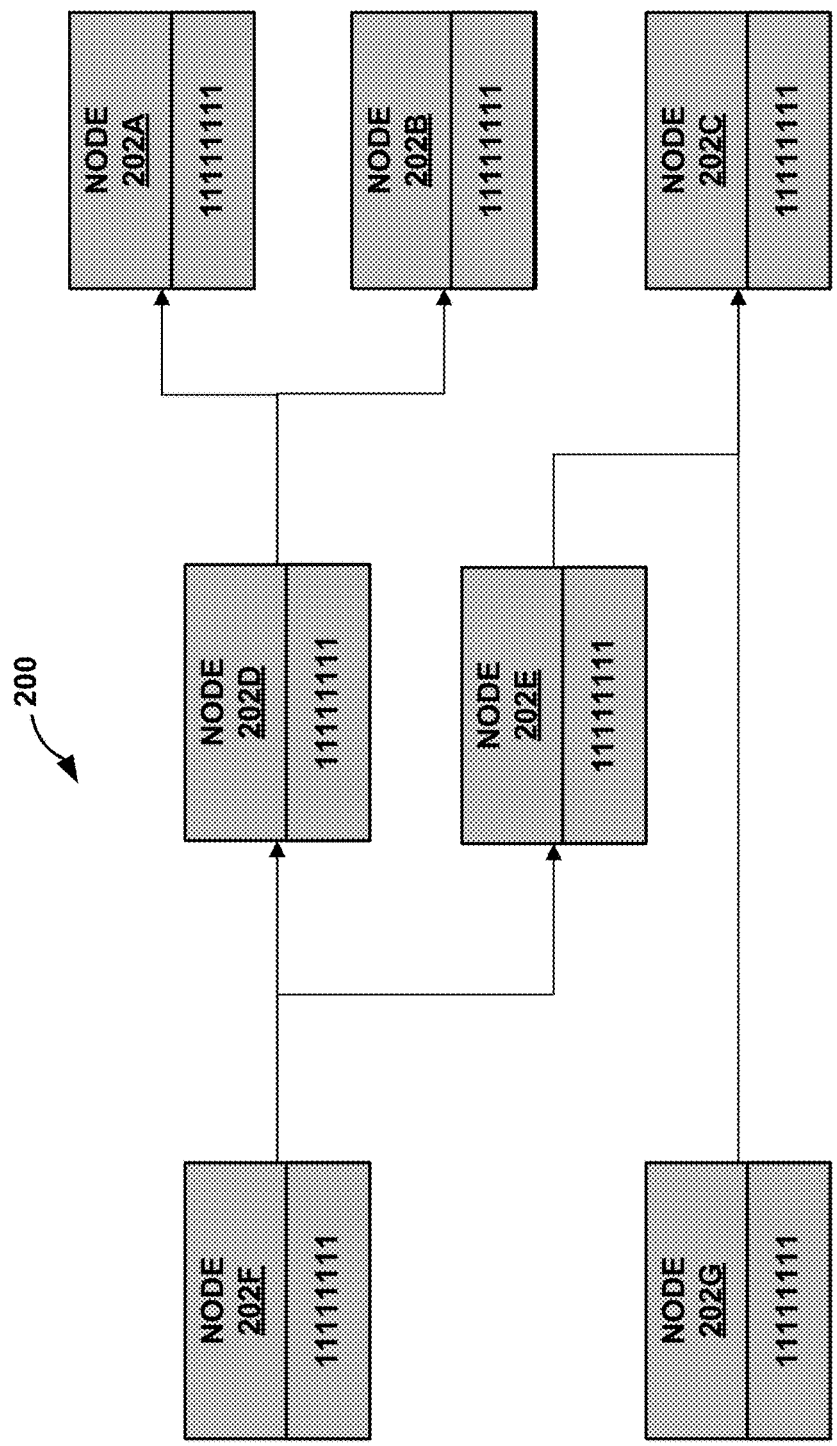

In the example of FIG. 2H, forwarding manager 16A may walk backwards along node graph 200 from node 202C to identify a preceeding node, e.g., node 202G, to be rebinded. In this example, forwarding manager 16A determines that dependency node 202C has been rebinded. Because dependency node 202C has been rebinded, forwarding manager 16A updates the binding mask of node 202G with the value of 11111111 to rebind node 202G with the updated set of packet processors.

Figure 3:
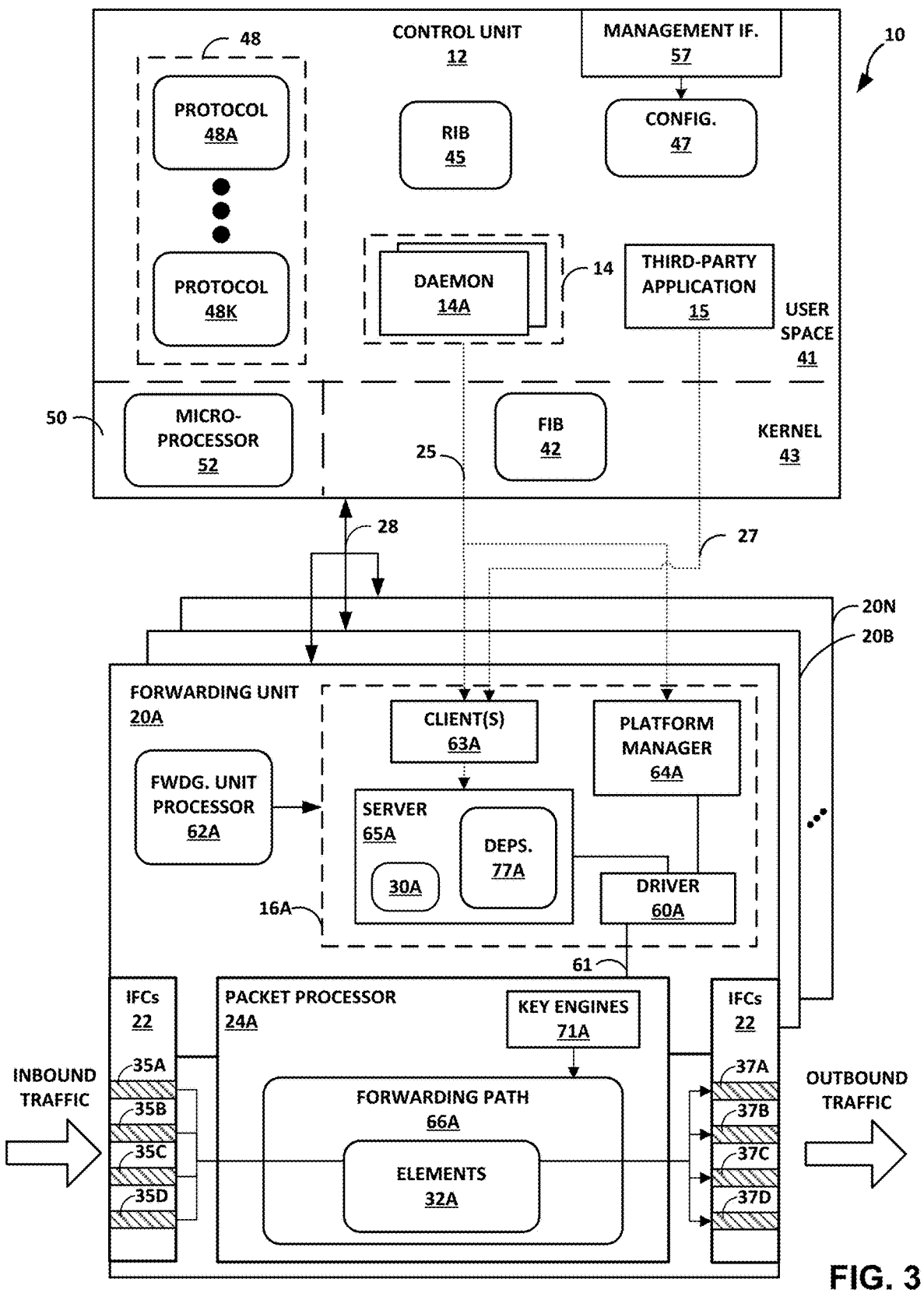
FIG. 3 is a block diagram illustrating, in further detail, an example network device in which a forwarding unit is configured, according to techniques described herein.

FIG. 3 is a block diagram illustrating, in further detail, an example network device in which a forwarding unit is configured, according to techniques described herein. Network device 10 illustrated in FIG. 3 may represent an example instance of network device 10 of FIG. 1.

In this example, control unit 12 includes a combination of hardware and software that provides a control plane operating environment for execution of various user-level host applications executing in user space 41. By way of example, host applications may include a management interface process 57 having a command-line interface and/or graphical user interface process to receive and respond to administrative directives, a routing protocol process of daemons 14 to execute one or more routing protocols of protocols 48A-48K (collectively, "protocols 48"), a network management process of daemons 14 to execute one or more network management protocols of protocols, an ARP process of daemons 14 to respond to ARP requests according the ARP protocol of protocols 48, a subscriber management process of daemons 14 to manage subscriber session setup and maintenance in accordance with one or more subscriber session management protocols (e.g., GPRS Tunneling Protocol-C (ontrol)), and so forth. In this respect, control unit 12 may provide routing plane, service plane, and management plane functionality for network device 10. Control units 12 may be distributed among multiple control units.

Daemons 14 and management interface 57 execute on and interact with kernel 43, which provides a run-time operating environment for user-level processes. Kernel 43 may represent, for example, a UNIX operating system derivative such as Linux or Berkeley Software Distribution (BSD). Kernel 43 offers libraries and drivers by which user-level processes may interact with the underlying system. Hardware environment 50 of control unit 12 includes microprocessor 52 that executes program instructions loaded into a main memory (not shown in FIG. 3) from a storage device (also not shown in FIG. 3) in order to execute the software stack, including both kernel 43 and user space 41, of control unit 12. Microprocessor 52 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, a routing protocol process of daemons 14 executes one or more interior and/or exterior routing protocols to exchange routing information with other network devices and store received routing information in routing information base 45 ("RIB 45"). RIB 45 may include information defining a topology of a network, including one or more routing tables and/or link-state databases. The routing protocol process resolves the topology defined by routing information in RIB 45 to select or determine one or more active routes through the network and then installs these routes to forwarding information base 42 ("FIB 42") of kernel 43. Typically, the routing protocol process generates FIB 42 in the form of a radix or other lookup tree to map packet information (e.g., header information having destination information and/or a label stack) to next hop devices and ultimately to interface ports of interface cards associated with respective forwarding units 20A-20N. Each of forwarding units 20 may be programmed with a different FIB.

Network device 10 also includes a plurality of forwarding units 20A-20N (collectively, "forwarding units 20") and a switch fabric (not shown) that together provide a data plane for forwarding network traffic. Forwarding units 20 connect to control unit 12 in this example by communication links 23, which may represent an Ethernet network.

Each of forwarding units 20 may include substantially similar components performing substantially similar functionality, said components and functionality being described hereinafter primarily with respect to forwarding unit 20A illustrated in detail in FIG. 3. Forwarding unit 20A of FIG. 3 may illustrate, in further detail, an example of forwarding unit 20A of FIG. 1. Forwarding unit 20A receives and sends network packets via inbound interfaces 35 and outbound interfaces 37, respectively, of interface cards (IFCs) 22 of forwarding unit 20A. Forwarding unit 20A also includes packet processor 24A, which represents hardware or a combination of hardware and software that provide high-speed forwarding of network traffic. Likewise, forwarding unit 20B includes packet processor 24B, and so on. In some examples, one or more of forwarding units 20 may each include multiple packet processors substantially similar to packet processor 24A.

Each of IFCs 22 may include interfaces for various combinations of layer two (L2) technologies, including Ethernet, Gigabit Ethernet (GigE), and Synchronous Optical Networking (SONET) interfaces. In various aspects, each of forwarding units 20 may include more or fewer IFCs. In some examples, each of packet processors 24 is associated with different IFCs of the forwarding unit on which the packet processor is located. The switch fabric (again, not shown in FIG. 3) connecting forwarding units 20 provides a high-speed interconnect for forwarding incoming transit network packets to the selected one of forwarding units 20 for output over one of IFCs 22.

Network device 10 may in some instances represent a multi-chassis router, and the switch fabric may include a multi-stage switch fabric, such as a 3-stage Clos switch fabric, that relays packet-switched communications and circuit-switched communications between the routing nodes of the multi-chassis router via optical interconnects using multiplexed communications.

Forwarding units 20A-20N of network device 10 demarcate control plane and data plane of network device 10. That is, forwarding unit 20A performs control plane and data plane functionality. In general, packet processor 24A and IFCs 22 implement a data plane for forwarding unit 20A, while forwarding unit processor 62A (illustrated as "fwdg. unit processor 62A") executes software including forwarding manager 16A and packet processor driver 60A that implement portions of the network device 10 control plane within forwarding unit 20A. Control unit 12 also implements portions of the control plane of network device 10. Forwarding unit processor 62A of forwarding unit 20A manages packet processor 24A and executes instructions to provide interfaces to control unit 12 and handle host-bound or other local network packets (such as packets that include Options Field values or TTL-expired packets). Forwarding unit processor 62A may execute a microkernel for forwarding unit 20A. The microkernel executed by forwarding unit processor 62A may provide a multi-threaded execution environment for executing modules of forwarding manager 16A and packet processor driver 60.

Packet processor 24A may include programmable ASIC-based, FPGA-based, or other types of packet processors that process network packets by performing a series of operations on each packet over respective internal packet forwarding paths as the packets traverse the internal architecture of network device 10. Packet processor 24A includes forwarding path elements 32A that, in general, when executed, examine the contents of each packet (or another packet property, e.g., incoming interface) and on that basis make forwarding decisions, apply filters, and/or perform accounting, management, traffic analysis, and load balancing, for example. In one example, packet processor 24A arranges forwarding path elements as next hop data that can be chained together as a series of "next hops" along an internal packet forwarding path 66A ("forwarding path 66A") for the packet processor 24A. The result of packet processing determines the manner in which a packet is forwarded or otherwise processed by packet processors 24 of forwarding units 20 from the packet's input interface on an ingress forwarding unit of forwarding units 20 to its output interface on an egress forwarding unit of forwarding units 20.

Packet processor 24A identifies packet properties and performs actions bound to the properties. One or more key engines 71A of packet processor 24A execute microcode (or "microinstructions") of the forwarding path elements to control and apply fixed hardware components of the forwarding path to process packet "keys." A packet key includes packet fields and other parameters that determine a flow of packet processing for the packet along an internal forwarding path. Internal forwarding path 66A ("forwarding path 66A") may represent a computer-readable storage medium, such as random access memory, and includes forwarding path elements in the form of programmable, executable microcode and fixed hardware components that determine the packet processing actions and other operations performed by packet processor 24A. Forwarding path 66A may include, for example, executable instructions, programmable logic, and application-specific logic that perform lookups, rate limit packet flows (e.g., using policers), and manipulate packet keys, among other functions. Forwarding path elements 32A may include primitives such as lookup tables and lookup trees, along with rate limiters, policers, counters, firewalls, and other elements.

Internal forwarding paths of network device 10 may include combinations of respective forwarding paths 66 of multiple different packet processors 24. In other words, forwarding path 66A of packet processor 24A may include only a part of the overall internal forwarding path of network device 10. Control unit 12 may configure forwarding path 66A of packet processor 24A to identify host-bound network packets and forward such packets toward control unit 12. For example, control unit 12 may program filters that include a network address of a network device 10 and direct packet processor 24A to forward network packets having a destination address that matches the network address toward control unit 12.

In some examples, packet processor 24A binds actions to be performed on packets received by the packet processor 24A to identification of one or more properties of the packets. That is, upon identifying certain packet properties, packet processor 24A performs the action bound to the properties. Packet properties may include packet metadata such as a particular packet's ingress interface or egress interface (as determined by the packet processors 24) as well as information carried by the packet and packet header, such as packet header fields, destination route prefixes, layer four (L4) or Transport Layer protocol destination ports, and the packet payload. Actions bound to packet characteristics may include count, discard, forward to a specified forwarding path element or interface, filter, sample, rate limit, and Quality of Service (QoS) marking, differential services (DiffServ), load balance, intrusion detection and prevention, L2 class of service (CoS), and L2 or L2 Virtual Private Network (L2VPN) switching.

Each of key engines 71A includes one or more key buffers to store packet field data for corresponding packets that the key engine is currently processing. Key buffers may also provide limited writable memory to which elements of the internal forwarding path may write to pass messages accessible by future elements.

Forwarding path elements 32A (also referred to as "primitives") of forwarding path 66A include data structures having entries, or "items," that correspond to packet key values and bind the values to actions to be performed by key engines 71A executing forwarding path 66A. In this respect, at least some of forwarding path elements 32A represent a tightly-coupled combination of executable instructions that correspond to bound actions and of data for possible packet key values. A tree lookup one of forwarding path elements 32A may perform a longest-match prefix lookup in a routing table or search a list of prefixes in a filter program. A table lookup one of forwarding path elements 32A may determine whether another one of forwarding path elements 32A should be performed by key engines 71A. For example, a key engine 71A may perform a table lookup of packet properties to determine that key engines 71A should further perform a tree lookup to identify an outbound interface for the packet. Packet processor 24A may store forwarding path elements 32A in computer-readable storage media, such as static random access memory (SRAM). While illustrated within packet processor 24A, forwarding path elements 32A may be stored in memory external and accessible to packet processor 24A.

In some aspects, actions of forwarding path 66 use a forwarding path element data structure to initiate processing. At the end of each processing step by one of key engines 71A, such as execution of one of a forwarding path element 32A, the result is a forwarding path element that may specify additional processing or the termination of processing, for instance. In addition, forwarding path elements may specify or otherwise represent one or more functions to be executed by key engines 71A. Example forwarding path element functions include policing (i.e., rate limiting), counting, and sampling. Forwarding path elements thus form the primary data structure that can be used to initiate a lookup or another forwarding path element, chain lookups and forwarding path elements together to allow for multiple lookup and other operations to be performed on a single packet, and terminate a lookup. Key engines 71 may be associated with respective result (or "lookup") buffers that store results for executing forwarding path elements. For example, a key engine 71 may execute a lookup specified by a forwarding path element and store the result of the lookup to the associated result buffer. The contents of a result buffer may affect the actions of the forwarding path element in the forwarding topology.

Additional information regarding forwarding path elements (next hops) and forwarding path element (next hop) chaining is available in PLATFORM-INDEPENDENT CONTROL PLANE AND LOWER-LEVEL DERIVATION OF FORWARDING PATH ELEMENTS, U.S. Pat. No. 7,990,993, filed Nov. 6, 2008, which is incorporated herein by reference in its entirety. Example details of a network router in which a control plane programs a forwarding plane with forwarding path elements are described in U.S. Pat. No. 8,806,058, filed Jul. 29, 2011, and titled PACKET FORWARDING PATH PROGRAMMING USING A HIGH-LEVEL DESCRIPTION LANGUAGE; and in U.S. Pat. No. 7,215,637, issued May 8, 2007, and titled SYSTEMS AND METHODS FOR PROCESSING PACKETS, the entire contents of each of which are incorporated herein by reference.

Forwarding unit 20A receives inbound network traffic by IFCs 22, and packet processor 24A processes network traffic using internal forwarding path 66A. Packet processor 24A looks up outbound interfaces for and forwards transit network packets that are neither host-bound nor otherwise require a response of logical decision by the control plane as outbound traffic via outbound interfaces 37. Although described primarily with respect to a single packet processor 24A and a single forwarding path 66A, forwarding manager 16A for forwarding unit 20A may configure multiple packet processors 24 each having a separate and/or shared forwarding path 66.

Forwarding unit 20A executes forwarding manager 16A software and presents interfaces to control unit 12 for configuring forwarding path 66A. One or more clients 63A, server module ("server") 65A, platform manager 64A, and driver 60A may represent different processes executed by forwarding unit processor 62A using, e.g., an operating environment provided by a microkernel (not shown). Server 65A may be multi-threaded to concurrently support communication with multiple clients 63A. Each of clients 63A may communicate with one thread of server 65A to facilitate all operations specified to that client 63A/thread are executed in a sequence.

Server 65A presents an application programming interface (API) to enable clients 63A to create forwarding path elements 32A in forwarding path 66A by creating, referencing, and connecting forwarding path elements 32A using nodes 30A. Server 65A translates nodes 30A received from clients 63A into corresponding forwarding path elements 32A supported by packet processor 24A. Each of forwarding path elements 32A has a corresponding one of nodes 30A stored by server 65A and accessible using the server 65A API. Clients 63A use the API for nodes 30A to create sandboxes (described in further detail below), program entries into lookup-type forwarding path elements 32A, and connect forwarding path elements 32A to program end-to-end forwarding state.

In this way, server 65A implements a stateful translation bridge between clients 63A and the underlying hardware/forwarding path 66A of packet processor 24A. For example, clients 63A send a stream of nodes and entries and server 65A translates the nodes and entries into forwarding path elements 32A for configuring forwarding path 66A. Server 65A also includes data structures for tracking and managing nodes 30A received from the clients 63A, and in this way managing the overall forwarding state as represented in forwarding path 66A. One example such data structure of server 65A, dependencies 77A, is illustrated in FIG. 3.

Server 65A generates dependencies 77A using pointers or the list of token references of nodes 30A that specify dependencies for the nodes. Server 65A represents dependencies in the dependencies 77A data structure, such as a node graph (e.g., node graph 200 of FIGS. 2A-2H). The dependencies 77A data structure may also represent one or more trees, lists, tables, maps, etc. The dependencies 77A data structure enables server 65A to more readily and rapidly determine which nodes 30A (and corresponding forwarding path elements 32A) should be updated when another node is modified. Using the above example, dependencies 77A may include a map or other data structure that includes one or more mappings that map a node ("node X") to all other nodes 30A that have the pointer or node X token value in their lists of token references. If node X is subsequently modified, server 65A maps node X to those nodes 30A that are dependent on node X using dependencies 77A and updates the forwarding path elements 32A for those nodes 30A. In this way, server 65A uses dependencies 77A to propagate changes made to a node 30A to the underlying forwarding topology of forwarding path 66A.

Packet processor driver 60A (hereinafter, "driver 60A"), configured for execution by forwarding unit processor 62A, configures forwarding path 66A with forwarding path elements 32A for execution by packet processor 24A. Packet processor driver 60A receives forwarding path elements 32A from server 65A and platform manager 64A. Forwarding path elements 32A may include instructions executable by packet processor 24A.

Clients 63A receive data 25, 27 from applications, the data 25, 27 representing packet processing operations, and translate data 25, 27 to nodes 30A that platform manager 64A and server 65A push to driver 60A to configure forwarding path 66A. Clients 63A may represent an interface adapter, e.g., a P4, OpenFlow, Switch Abstraction Interface (SAI), or other software-defined networking (SDN) protocol interface adapter that receives operations on the corresponding interface with a controller or the third-party application 15 and translates the operations to nodes 30A using the server 65A API. Clients 63A push nodes 30A to server 65A, which configures the corresponding forwarding path elements 32A in forwarding path 66A using driver 60A.

In some cases, client 63A may adjust a parameter (e.g., a policer parameter changed in the configuration) or change a dependency (e.g., point a route prefix to a different next hop) for a node. Server 65A may consider nodes and entries immutable (i.e., unchangeable) once configured in the forwarding path 66A. Accordingly, to change the node, client 63A inserts a new node with the same token value as the node being "modified." Server 65A receives the new node, deletes the forwarding path element corresponding to the old node from forwarding path 66A, inserts a new forwarding path element corresponding to the new node in forwarding path 66A, regenerates any underlying hardware state, and updates any dependencies in dependencies 77A and among forwarding path elements 32A. As a result of the server 65A providing this service, the client 63A need only insert the new, updated node.

In accordance with the techniques described in this disclosure, forwarding manager 16A leverages the dependencies 77A data structure (e.g., node graph) to rebind nodes 30A with an updated set of one or more packet processors. More specifically, forwarding manager 16A updates, for example, a bitmask identifying an updated set of one or more packet processors for each node of the node graph in a reverse direction. For example, forwarding manager 16A may start the rebinding operation from a termination from the node graph, and rebind preceding nodes if the dependencies of the preceding nodes are rebinded. If any of the dependencies of the preceding nodes are not rebinded, forwarding manager 16A skips the rebinding of the preceding node and proceeds to rebind another termination node of the node graph. This process continues until all the nodes of the node graph are rebinded.

In some examples, forwarding unit processor 62A that executes software including forwarding manager 16A to generate a plurality of queues ("workqueues") used for the rebinding process. During the rebinding process, a rebind request fills the workqueues with node rebind operations, one for each node with no dependencies (e.g., termination nodes). In some examples, the forwarding unit processor 62A executes forwarding manager 16A to handle the work from the workqueues using round-robin scheduling. The plurality of workqueues enables asynchronous breaks to occur during the rebinding process to skip the rebinding of a preceding node when a dependency of the preceding node is not rebinded, and to rebind a subsequent termination node. In this way, the rebinding process may delay rebinding of a preceding node until all of its dependencies have been rebinded.

Figure 4:
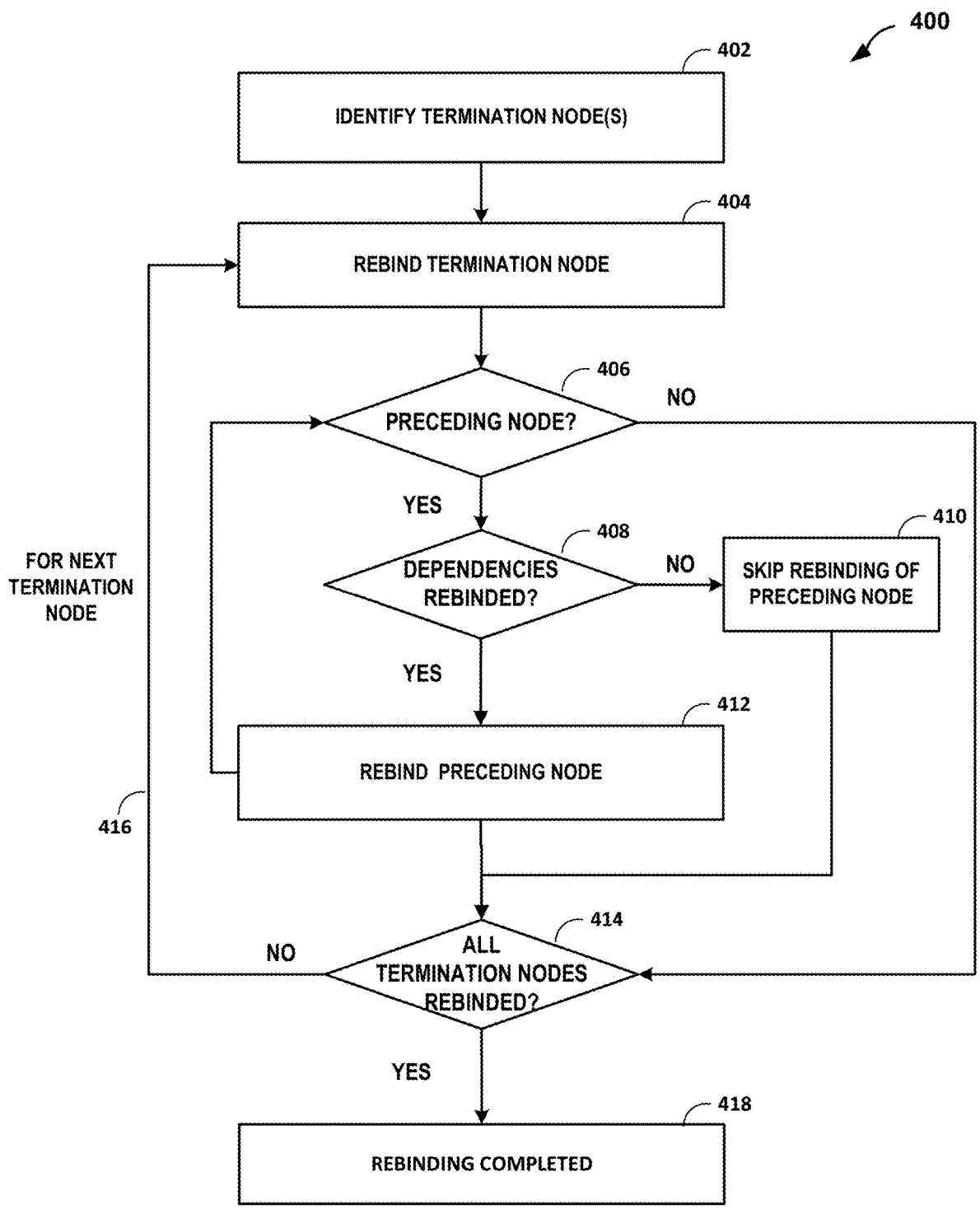
FIG. 4 is a flowchart illustrating an example mode of operation for a network device, in accordance with techniques described in this disclosure.

FIG. 4 is a flowchart illustrating an example mode of operation for a network device, in accordance with techniques described in this disclosure. Mode of operation 400 is described with respect to forwarding manager 16A of network device 10 of FIG. 1 but may be executed by any forwarding unit processor that executes instructions to configure at least one packet processor for a line card. The mode of operation 400 is also described with respect to the graph-based rebinding operation as described in FIGS. 2A-2H.

Forwarding manager 16A may identify one or more termination nodes of a node graph (402). For example, forwarding manager 16A may determine whether a node of the node graph has a child node in the forwarding topology. If the node does not reference a child node, the node is determined to be a termination node. With respect to the graph-based rebinding operation as described in FIGS. 2A-2H, forwarding manager 16A may determine that nodes 202A, 202B, and 202C of node graph 200 are termination nodes.

Forwarding manager 16A may rebind a termination node of the termination nodes with an updated set of one or more packet processors to (404). For example, forwarding manager 16A may update a binding mask of node 202A that identifies the updated set of packet processors (e.g., from 00001111 to 11111111).

Forwarding manager 16A may identify a preceding node to the termination node 202A (406). For example, forwarding manger 16A may walk backwards along node graph 200 from node 202A to node 202D. Forwarding manager 16A then determines whether the dependencies of the preceding node 202D are rebinded (408). For example, forwarding manager 16A determines whether dependency nodes 202A and 202B, are rebinded. If the dependencies have not been rebinded ("NO" of step 408), forwarding manager 16A skips the rebind of the preceding node (410). At this stage in the example rebinding process, node 202B is not rebinded. As such, forwarding manager 16A skips the rebinding of node 202D to avoid an intermediate rebind of node 202D before any of its dependency nodes have been rebinded. Forwarding manager 16A then proceeds with the rebinding operation for the next termination nodes. For example, forwarding manager 16A determines that not all termination nodes are rebinded ("NO" of step 414), and continues the rebinding process with the next termination node (416). As described above, forwarding manager 16A generates workqueues that are filled with node rebind operations, one for each of termination nodes 202A-202C. By skipping the rebind of node 202D and continuing the rebinding process with node 202B, in this example, the rebinding process is broken into smaller steps, which avoids long periods of traffic blocking (e.g., from resetting packet processors to reprogram) to rebind. In this example, forwarding manager 16A rebinds node 202B (406). For example, forwarding manager 16A may update a binding mask of node 202B that identifies the updated set of packet processors (e.g., from 00001111 to 11111111). Forwarding manager 16A may identify a preceding node to node 202B (406). For example, forwarding manger 16A may walk backwards through node graph 200 from node 202B to node 202D. Forwarding manager 16A then determines whether the dependencies of the preceding node are rebinded (408). For example, forwarding manager 16A determines whether dependency nodes 202A and 202B are rebinded. Since nodes 202A and 202B are rebinded at this stage of the example rebinding process ("YES" of step 408), forwarding manager 16A rebinds node 202D (412).

Forwarding manager 16A may identify a preceding node to node 202D (406). For example, forwarding manger 16A may walk backwards along node graph 200 from node 202D to node 202F. If the dependencies of node 202F, e.g., nodes 202D and 202E, are not rebinded ("NO" of step 408), forwarding manager 16A skips the rebind of node 202F. At this stage in the example rebinding process, node 202E is not rebinded. As such, forwarding manager 16A skips the rebinding of node 202F.

Forwarding manager 16A then proceeds with the rebinding operation for the next termination nodes. For example, forwarding manager 16A determines that not all termination nodes are rebinded ("NO" of step 414), and continues the rebinding process with the next termination node (416). In this example, forwarding manager 16A may rebinds node 202C (406). For example, forwarding manager 16A may update a binding mask of node 202C that identifies the updated set of packet processors (e.g., from 00001111 to 11111111). Forwarding manager 16A may identify a preceding node to node 202C (406). For example, forwarding manger 16A may walk backwards along node graph 200 from node 202C to node 202E. Forwarding manager 16A then determines whether the dependencies of the preceding node are rebinded (408). For example, forwarding manager 16A determines whether dependency node 202C has been rebinded. Since node 202C has been rebinded at this stage in the example rebinding process ("YES" of step 408), forwarding manager 16A rebinds node 202E (412). For example, forwarding manager 16A may update a binding mask of node 202E that identifies the updated set of packet processors (e.g., from 00001111 to 11111111).

Forwarding manager 16A may identify a preceding node to node 202E (406). For example, forwarding manger 16A may walk backwards along node graph 200 from node 202E to node 202F. In this instance, the dependencies of node 202F, e.g., nodes 202D and 202E, are rebinded ("YES" of step 408). As such, forwarding manager 16A rebinds node 202F. For example, forwarding manager 16A may update a binding mask of node 202F that identifies the updated set of packet processors (e.g., from 00001111 to 11111111).

Forwarding manager 16A may identify additional preceding nodes to the termination node 202C (406). For example, forwarding manger 16A may walk backwards along node graph 200 from node 202C to node 202G Forwarding manager 16A then determines whether the dependencies of the preceding node 202G are rebinded (408). For example, forwarding manager 16A determines that dependency node 202C is rebinded. In this example, node 202Ds has been rebinded. As such, forwarding manager 16A rebinds node 202F. For example, forwarding manager 16A may update a binding mask of node 202F that identifies the updated set of packet processors (e.g., from 00001111 to 11111111).

Forwarding manager 16A may then identify any additional nodes to be rebinded. If forwarding manager 16A determines that all nodes are rebinded ("YES" of step 414), the rebinding operation is completed (418) and the nodes may begin processing packets according to the path forwarding elements.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals or carrier waves, although the term "computer-readable media" may include transient media such as signals, in addition to physical storage media.

What is claimed is:

1. A method comprising:
   generating, by a forwarding manager for an internal forwarding path executed by a plurality of packet processors of a forwarding unit of a network device, a dependencies structure that specifies one or more dependencies for a plurality of nodes, wherein the plurality of nodes represent different types of forwarding path elements of the forwarding path, wherein the plurality of nodes is binded to a first set of one or more packet processors of the plurality of packet processors, wherein a first bitmask is configured for each of the first set of one or more packet processors to indicate the plurality of nodes is binded to the first set of one or more packet processors; and
   rebinding, by the forwarding manager, a second set of one or more packet processors of the plurality of packet processors to the plurality of nodes, wherein the second set of one or more processors includes the first set of one or more packet processors, wherein rebinding the second set of one or more packet processors of the plurality of packet processors to the plurality of nodes is performed in a reverse direction of the dependencies structure, wherein a second bitmask is configured for each of the second set of one or more packet processors to indicate the plurality of nodes is rebinded to the second set of one or more packet processors.

2. The method of claim 1, wherein the forwarding unit comprises a line card insertable within a chassis of the network device.

3. The method of claim 1, wherein rebinding the second set of one or more packet processors to the plurality of nodes is performed in a reverse direction of the dependencies structure comprises:
   identifying, by the forwarding manager, a termination node of the dependencies structure, wherein the termination node does not reference a child node in the dependencies structure;
   rebinding, by the forwarding manager, the termination node;
   identifying, by the forwarding manager, a preceding node to the termination node;
   determining, by the forwarding manager, whether one or more dependencies of the preceding node are rebinded; and
   rebinding, by the forwarding manager and in response to determining that each of the one or more dependencies of the preceding node are rebinded, the preceding node.

4. The method of claim 3, further comprising:
   skipping, by the forwarding manager and in response to determining that each of the one or more dependencies of the preceding node are not rebinded, the rebinding of the preceding node.

5. The method of claim 3, wherein the preceding node comprises a first preceding node further comprising:
   identifying, by the forwarding manager, a second preceding node to the first preceding node;
   determining, by the forwarding manager, whether one or more dependencies of the second preceding node are rebinded; and
   rebinding, by the forwarding manager and in response to determining that each of the one or more dependencies of the second preceding node are rebinded, the second preceding node.

6. The method of claim 5, further comprising:
   skipping, by the forwarding manager and in response to determining that each of the one or more dependencies of the second preceding node are not rebinded, the rebinding of the second preceding node.

7. The method of claim 1, wherein the dependencies structure comprises a graph data structure.

8. The method of claim 1, wherein each of the forwarding path elements comprises at least one instruction executable by the at least one packet processor.

9. A non-transitory computer-readable medium comprising instructions for causing one or more programmable processors and at least one packet processor of a forwarding unit of a network device to:
   generate a dependencies structure that specifies one or more dependencies for a plurality of nodes, wherein the plurality of nodes represent different types of forwarding path elements of the forwarding path, wherein the plurality of nodes is binded to a first set of one or more packet processors of the plurality of packet processors, wherein a first bitmask is configured for each of the first set of one or more packet processors to indicate the plurality of nodes is binded to the first set of one or more packet processors, and
   rebind a second set of one or more packet processors of the plurality of packet processors to the plurality of nodes, wherein to rebind the second set of one or more packet processors to the plurality of nodes is performed in a reverse direction of the dependencies structure, wherein a second bitmask is configured for each of the second set of one or more packet processors to indicate the plurality of nodes is binded to the second set of one or more packet processors.

10. The non-transitory computer-readable medium of claim 9, wherein the instructions further comprises instructions to:
- identify a termination node of the dependencies structure, wherein the termination node does not reference a child node in the dependencies structure;
- rebind the termination node;
- identify a preceding node to the termination node;
- determine whether one or more dependencies of the preceding node are rebinded; and
- rebind, in response to determining that each of the one or more dependencies of the preceding node are rebinded, the preceding node.

11. A network device comprising:
- a control unit configured to execute at least one application; and
- a forwarding unit comprising:
  - an interface card configured to receive packets;
  - at least one packet processor operably coupled to a memory;
  - an internal forwarding path, wherein at least a portion of the forwarding path is stored to the memory and is executable by the at least one packet processor;
  - a forwarding unit processor; and
  - a forwarding manager configured for execution by the forwarding unit processor, wherein the forwarding manager is configured to:
- generate a dependencies structure that specifies one or more dependencies for a plurality of nodes, wherein the plurality of nodes represent different types of forwarding path elements of the forwarding path, wherein the plurality of nodes is binded to a first set of one or more packet processors of the plurality of packet processors, wherein a first bitmask is configured for each of the first set of one or more packet processors to indicate the plurality of nodes is binded to the first set of one or more packet processors, and
- rebind a second set of one or more packet processors of the plurality of packet processors to the plurality of nodes, wherein to rebind the second set of one or more packet processors to the plurality of nodes is performed in a reverse direction of the dependencies structure, wherein a second bitmask is configured for each of the second set of one or more packet processors to indicate the plurality of nodes is rebinded to the second set of one or more packet processors.

12. The network device of claim 11, wherein, to rebind the second set of one or more packet processors to the plurality of nodes is performed in a reverse direction of the dependencies structure, the forwarding manager is further configured to:
- identify a termination node of the dependencies structure, wherein the termination node does reference a child node in the dependencies structure;
- rebind the termination node;
- identify a preceding node to the termination node;
- determine whether one or more dependencies of the preceding node are rebinded; and
- rebind, in response to determining that each of the one or more dependencies of the preceding node are rebinded, the preceding node.

13. The network device of claim 12, wherein the forwarding manager is further configured to:
- skip, in response to determining that each of the one or more dependencies of the preceding node are not rebinded, the rebinding of the preceding node.

14. The network device of claim 12, wherein the preceding node comprises a first preceding node, wherein the forwarding manager is further configured to:
- identify a second preceding node to the first preceding node;
- determine whether one or more dependencies of the second preceding node are rebinded; and
- rebind, in response to determining that each of the one or more dependencies of the second preceding node are rebinded, the second preceding node.

15. The network device of claim 14, wherein the forwarding manager is further configured to:
- skip, in response to determining that each of the one or more dependencies of the second preceding node are not rebinded, the rebinding of the second preceding node.

16. The network device of claim 11, wherein the dependencies structure comprises a graph data structure.

17. The network device of claim 11, wherein each of the forwarding path elements comprises at least one instruction executable by the at least one packet processor.

18. The network device of claim 11, wherein the forwarding unit comprises a line card insertable within a chassis of the network device.

* * * * *